US012570890B2

(12) United States Patent
Deshpande et al.

(10) Patent No.: US 12,570,890 B2
(45) Date of Patent: Mar. 10, 2026

(54) ADDITIVES FOR WELL TREATMENT, METHODS FOR PREPARING WELL TREATMENT COMPOSITION USING THESE ADDITIVES, AND APPLICATIONS OF SAID COMPOSITION

(71) Applicant: Cameron International Corporation, Houston, TX (US)

(72) Inventors: Pradyumna Avinash Deshpande, Aberdeen (GB); Graham Robert Drummond, Aberdeen (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/833,565

(22) PCT Filed: May 16, 2023

(86) PCT No.: PCT/US2023/022346
§ 371 (c)(1),
(2) Date: Jul. 26, 2024

(87) PCT Pub. No.: WO2023/224967
PCT Pub. Date: Nov. 23, 2023

(65) Prior Publication Data
US 2025/0297153 A1 Sep. 25, 2025

Related U.S. Application Data

(60) Provisional application No. 63/364,769, filed on May 16, 2022.

(51) Int. Cl.
*C09K 8/524* (2006.01)
*E21B 37/06* (2006.01)

(52) U.S. Cl.
CPC ............. *C09K 8/524* (2013.01); *E21B 37/06* (2013.01); *C09K 2208/08* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 7,681,638 B2 | 3/2010 | Soni | |
| 2016/0168443 A1 | 6/2016 | Lafitte | |
| 2018/0044569 A1* | 2/2018 | Yakovlev | ................ C04B 28/04 |
| 2018/0209240 A1* | 7/2018 | Gupta | .................... E21B 33/13 |
| 2018/0245440 A1* | 8/2018 | Entchev | ............. E21B 43/2405 |

FOREIGN PATENT DOCUMENTS

| | | |
|---|---|---|
| CN | 101565830 A | 10/2009 |
| CN | 108641693 A | 10/2018 |
| CN | 109926407 A | 6/2019 |

OTHER PUBLICATIONS

Rastogi, V. K. et. al., "Mechanism for Tuning the Hydrophobicity of Microfibrillated Cellulose Films by Controlled Thermal Release of Encapsulated Wax", Materials 2014, 7(11), pp. 7196-7216.
Search Report and Written Opinion of International Application No. PCT/US2023/022346 dated Sep. 15, 2023, 10 pages.

* cited by examiner

*Primary Examiner* — Andrew Sue-Ako
(74) *Attorney, Agent, or Firm* — Jeffrey D. Frantz

(57) ABSTRACT

A well treatment composition wax removal additives for the cleaning of a well containing hydrocarbons waxes. The wax removal additives comprise nano polysaccharides. A method of cleaning a hydrocarbon well containing at least one of wax, asphaltenes or scale, by injecting a nano polysaccharide solution.

17 Claims, No Drawings

ADDITIVES FOR WELL TREATMENT, METHODS FOR PREPARING WELL TREATMENT COMPOSITION USING THESE ADDITIVES, AND APPLICATIONS OF SAID COMPOSITION

CROSS-REFERENCE TO RELATED APPLICATIONS

This patent application is a National Stage Entry of PCT/US2023/022346 filed May 16, 2023, which claims benefit of U.S. Provisional Patent Application Ser. No. 63/364,769 filed May 16, 2022, which is entirely incorporated herein by reference.

BACKGROUND

Hydrocarbon fluids, during the production and transportation from reservoir to the surface and onward to refinery, undergo pressure and temperature changes. These changes along with changes in operating conditions can lead to destabilization and precipitation of various components in the fluids (e.g., paraffins, asphaltenes, scales). Under certain conditions, these precipitated components can cause significant flow assurance challenges including, but not limited to, an increase in fluid viscosity and deposition of solids on pipeline surfaces, vessels and other oilfield equipment. These, in turn, can then cause numerous operational challenges such as flow restriction in a pipeline, increased solids during pigging operations leading to decreased cleaning efficiency, or higher pipeline back pressure leading to lower throughput. Various thermal, mechanical and chemical methods are used to prevent and mitigate the precipitation and deposition of these components and to subsequently avoid costly delays due to their interference in the production and transportation process. These remedial methods include pigging or scraping, insulating equipment and flow lines to prevent loss of heat, applying heat by means of a heated liquid (e.g., hot oil or hot water), using a heat generated reaction, or the application of inhibitors, dispersants or solvents.

Paraffin precipitation and deposition and its effect of fluid flow in a pipeline remains one of the biggest challenges in the oilfield industry. Precipitation of paraffin ($CnH2n+2$) from hydrocarbons is a function of primarily temperature, however there are other parameters, such as pressure, that affect the solubility of paraffin in hydrocarbon fluids and can cause its precipitation. To overcome these challenges, those various thermal, mechanical and chemical methods are used in the oilfield industry including using paraffin inhibitors, pour point depressants, paraffin dispersants, paraffin solvents and combinations thereof.

Applying either hot oil or hot water is one of the most common techniques used to clean the deposited wax and asphaltenes from the hydrocarbon wells. Hot oil or hot water is circulated down the casing and back up the tubing to remove the deposits from the wellbore. Hot water and oil melt the hydrocarbon deposits and then dissolve and/or disperse in the respective medium. Hot water mainly tends to soften the wax and hence it is easy to be dispersed and removed. Hot water is also used prior to deployment of a pig for effective pipeline cleanup.

In case of hot oiling, the hot oil used can be injected from the bottom of the tank where the highest amount of wax and asphaltenes are present. Hot oil is pumped down the annulus and by the time it reaches to the formation, the oil loses most of its heat and therefore the 'cooled' hot oil reduced its ability to melt the wax in the crude oil.

Since the hot oil also contains the dissolved wax from the casing, this might be transported into the formation where it can precipitate, leading to severe wax problems. A known solution has been to add a wax dispersant to keep the solubilized wax from re-depositing.

Similarly, for hot watering, hot water is pumped through the casing. By the time it comes back to the annulus, hot water however loses its energy and therefore melted wax in the downhole might get redeposited in the wellbore. Hence, it is not highly effective. The addition of a dispersant into the hot water can help to keep the melted wax dispersed in the water. In case of transportation pipelines, pigging might therefore be required to clean the remaining wax and asphaltenes deposits.

SUMMARY OF THE DISCLOSURE

In embodiments, it is proposed a well treatment composition comprising wax removal additives for the cleaning of a well containing hydrocarbons waxes.

In some embodiments, the wax removal additives are mixed in hot water to create a nano suspension.

In some embodiments, the wax removal additives are mixed with a combination of hot water and at least one water miscible solvent to create a nano suspension. In embodiments, the at least one water miscible solvent comprises methanol, isopropanol, butanol, ethylene glycol or aminobutyl ether.

In some embodiments, the wax removal additives comprise nano polysaccharides.

In some embodiments, the nano polysaccharides are taken by 0.001% to 3% by weight in an aqueous system.

In some embodiments, the nano polysaccharides comprise at least six carbon atoms.

In some embodiments, the nano polysaccharides comprise nanocrystalline cellulose.

In some embodiments, the nano polysaccharides comprise nanocrystalline cellulose with microfibers.

In some embodiments, the nano polysaccharides comprises at least one of sucrose, glucose, maltose, lactose, fructose, starch, glycogen, dextrin, Inulin, cyclodextrin or dextran.

In some embodiments, the nano polysaccharides can be modified with at least one of or a combination of styrene maleic anhydride, ethylene vinyl acetate, alkyl acrylates, polyisobutylene succinic anhydride or olefin maleic anhydride or surfactants. In embodiments, the surfactants may comprise alkyl sulphonic acid, alkyl phosphoric acid or alkyl amines.

In embodiments, the composition is used to clean flowlines, storage tanks and transportation lines.

In some embodiments, it is proposed methods to prepare a well treatment composition by mixing the following components together: at least one wax removal additive and at least hot water to create a nano suspension.

In an embodiment, the methods may load the well treatment composition into a pigging manifold connected to and in fluid communication with a pipeline.

In an embodiment, the methods may clean the pipeline by circulating the well treatment composition disposed within the pipeline.

In some embodiments, it is proposed methods of cleaning a hydrocarbon well containing at least one of wax, asphaltenes or scale, by injecting a nano polysaccharide solution.

In some embodiments, the method comprises injecting the nano polysaccharide solution downhole the hydrocarbon well and/or on topside of a flowing pipeline or a storage tank or a transportation line.

In some embodiments, the method comprises injecting the polysaccharide solution suspended in at least hot water and removing the wax from the wellbore or from flowing pipeline or from storage tanks or from transportation lines.

In some embodiments, the nano polysaccharide solution is added as such or in combination.

In some embodiments, the method comprises adding the nano polysaccharide solution at a molecular weight of fatty acid ester of carbohydrate/polysaccharides between about 300 and 100000 to the hydrocarbon well in an amount of 0.1% to 25% by weight.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

In one aspect, embodiments disclosed herein relate or are directed to wax deposition removal compositions and/or wax deposition removal fluids, methods for preparing the wax deposition removal compositions and/or wax deposition removal fluids, and/or methods for utilizing the wax deposition removal compositions and/or the wax deposition removal fluids in one or more applications in the oil and gas industry. The wax deposition removal compositions and/or the wax deposition removal fluids are configured or adapted to cleaning well containing hydrocarbons waxes.

Treatment fluid compositions described herein that can be used to remove waxes from hydrocarbon wells are aqueous nano suspensions of wax removal materials comprising polysaccharides. The polysaccharides generally have at least 6 carbon atoms. The polysaccharides can be, or can include, sucrose, glucose, maltose, lactose, fructose, starch, glycogen, dextrin, inulin, cyclodextrin, dextran, cellulose, or combinations thereof. Any isomers and enantiomers, and mixtures thereof, of such polysaccharides will work. The polysaccharides can be, or can include, nanocrystalline cellulose, which can be in the form of microfibers. In general, the wax removal materials herein can be used in granular form, fiber form, or a combination thereof. Any of the polysaccharides listed above can be modified by reaction with a hydroxyl reactive molecule such as a carboxylic acid, for example fatty acids or acids like acetic acids and citric acids (e.g. cellulose acetate or cellulose citrate), anhydride, amine, alkylene oxide, and or ester. The polysaccharides can also be modified by mixture with a surfactant, water miscible solvent, or other effective reagent including the types of molecules listed above whether or not they react with the hydroxyl groups of the polysaccharide. Examples of molecules that can be used with the polysaccharides herein include styrene maleic anhydride, ethylene vinyl acetate, alkyl acrylates, polyisobutylene succinic anhydride or olefin maleic anhydride or surfactants such as alkyl sulphonic acid, alkyl phosphoric acid, alkyl amines, and alcohol ethoxylates. Examples of solvents that can be used as part of the treatment fluids include methanol, isopropanol, butanol, ethylene glycol or aminobutyl ether. Mixtures of such solvents can also be used.

The wax removal materials suitable for use in the method described herein generally have molecular weight of up to about 500,000 Daltons, for example 300 to 100,000 Daltons, as neat polysaccharide or as a modified polysaccharide. For example, a fatty acid polysaccharide ester can be used that has molecular weight of 300 to 100,000 Daltons.

The wax removal materials described above are generally dispersed in an aqueous medium at a concentration of 0.001 wt % to 3 wt %, such as 0.5 wt % to 2 wt %, for example 0.5 wt %, 1.0 wt %, 1.5 wt %, or 2.0 wt %, based on the weight of the total treatment fluid. Larger and smaller concentrations can also be used and can be effective. For example, treatment fluids having up to 25 wt % of the wax removal materials described herein, based on the weight of the treatment fluid, for example in a range of 0.1 wt % to 25 wt %, can be used. The wax removal materials are sized to nano scale by agitation, shearing, or other action to break larger particles into smaller particles. The wax removal materials can be sized prior to addition to the aqueous medium or after addition to the aqueous medium. The resulting treatment fluid is a nano suspension of wax removal materials in the aqueous medium.

Composition Preparation

The wax deposition removal compositions and/or wax deposition removal fluids disclosed herein may be prepared using various components percentage as described below:

Product A: Take 995 g of distilled water in a waring blender. Measure 5 g of nanocrystalline cellulose such as—but not limited to—CelluForce NCC NCV100-NASD90 supplied by CelluForce Inc, USA. Slowly add the nanocrystalline cellulose sample into the blender and mix for about 2 min at high shear to make a homogeneous nano suspension. After mixing, take out the suspension in a bottle and store.

Product B: Take 990 g of distilled water in a waring blender. Measure 10 g of nanocrystalline cellulose (NCC). Slowly add the NCC sample into the blender and mix for about 2 min at high shear to make a homogeneous nano suspension. After mixing, take out the suspension in a bottle and store.

Product C: Take 985 g of distilled water in a waring blender. Measure 15 g of nanocrystalline cellulose (NCC). Slowly add the NCC sample into the blender and mix for about 2 min at high shear to make a homogeneous nano suspension. After mixing, take out the suspension in a bottle and store.

Product D: Take 980 g of distilled water in a waring blender. Measure 20 g of nanocrystalline cellulose (NCC). Slowly add the NCC sample into the blender and mix for about 2 min at high shear to make a homogeneous nano suspension. After mixing, take out the suspension in a bottle and store.

Determination of Melting Point of Wax Deposit

The melting/softening point of wax deposit might be measured using a cross polarized microscope. A sample might be taken in a glass plate cover with slide and placed and heated to about 75° C. The temperature might be maintained at 75° C. for about 5 min. The sample might then be slowly cooled down at 1° C./min rate and the temperature recorded at which first wax crystal appears. The temperature before will then be the melting point of the wax deposit.

Performance Test

A performance test of the wax deposition removal compositions and/or wax deposition removal fluids disclosed herein may be performed. About 2.0 g of wax deposit might be taken from the field and transferred into a 150 ml sani glass bottle. The sample might be heated in a water bath at a softening point temperature of the wax deposit for 30 min. After 30 min the bottle might be taken out from the water bath and the entire bottom of the bottle might be immediately coated with the melted deposit. The bottle might be cooled down to room temperature for about 1 h so that all wax deposit is solidified.

The bottle might then be shake well and 100 g of prepared product A, B, C or D nano suspensions slowly added as prepared earlier. In another bottle containing 2.0 g of wax deposit, 100 g of deionized water might be added. All the bottles might be placed in a water bath, at about 5° C. above the melting point of wax deposit, for about 30 min to make sure all wax has melted.

After 30 min, all bottles might be taken out from the water bath and shaken well for about 1 min, placed on bench and allowed to cool down to ambient temperature for about 30 min.

After 30 min, the bottles might be shaken for about 30 sec and all product containing suspended wax decanted. Acetone might be added to the bottles and shake well. All acetone might be slowly decanted and air dried without removing any loose wax in bottles. Any wax removed by the acetone wash might be put back into the bottle before air drying. The wax deposit remaining in the bottle might be recorded and the weight of wax removed and % wax removal might be calculated. The table below shows results of such performance test.

least one oil and gas industrial application may be selected from a downhole application, a wellbore fluid application, a fluid fracturing application, a pipeline application, or at least one combination thereof. The wax deposition removal compositions and/or wax deposition removal fluids presently disclosed herein achieve surprising and unexpected performance results with respect to the at least one oil and gas industrial application.

For general use downhole, a treatment fluid is prepared, substantially as described above. It should be noted that any suitable water can be used to make the treatment fluid. That is, although the examples above are made using distilled water, any reasonably usable available water can be used as the carrier medium of the treatment fluid. Thus, for example, produced water, ground water, sea water, clean non-potable water, and the like can be used alone or in mixtures. The wax removal material is dispersed within the water, along with any solvents to be used, as described above. The treatment fluid mixture can be subjected to high shear mixing to reduce the size of particles in the treatment fluid, or the wax removal materials can be ground or otherwise subjected to a sizing process prior to addition to the treatment fluid.

The treatment fluid thus prepared is pumped downhole into a well, optionally using a pipe disposed within the well to transport the treatment fluid. The treatment fluid may be heated prior to pumping downhole to facilitate wax removal. In some cases, the aqueous medium can be heated prior to adding wax removal material so that the wax removal material is added to a hot aqueous medium (e.g. hot water) to aid dispersion and ultimately wax removal. The treatment fluid can be heated to a temperature near a melting temperature of the wax, if such temperature is known, and where use of a heated aqueous medium would not be expected to affect the subterranean formation in an unwanted way. The treatment fluid can also be used at ambient temperature, although heating to any degree would be expected to hasten wax removal in general. In some cases, the treatment fluid may be held stationary within the well for a period of time to allow wax to exit the subterranean formation into the treatment fluid. The treatment fluid bearing removed wax is pumped to the surface by displacing the treatment fluid with another fluid, such as water, brine, drilling fluid, and the like. It should be noted, that the treatment fluids here can also be used to remove hydrocarbon wax from equipment such as flow lines, pipelines (for example using a pigging manifold

| Wax deposit | Melting point ° C. | Wax weight, g | Product | Product weight, g | Test temperature, ° C. | Weight of wax removed, g | Wax removal % |
|---|---|---|---|---|---|---|---|
| AF-C | 63 | 2.0 | Product A | 100.0 | 68 | 0.89 | 44.50 |
| | | 2.0 | Product B | 100.0 | | 1.14 | 57.00 |
| | | 2.0 | Product C | 100.0 | | 1.38 | 69.00 |
| | | 2.0 | Product D | 100.0 | | 1.05 | 52.50 |
| | | 2.0 | DI water | 100.0 | | 0.58 | 29.00 |
| AF-T | 66 | 2.0 | Product A | 100.0 | 71 | 0.93 | 46.50 |
| | | 2.0 | Product B | 100.0 | | 0.94 | 47.00 |
| | | 2.0 | Product C | 100.0 | | 1.68 | 84.00 |
| | | 2.0 | Product D | 100.0 | | 1.39 | 69.50 |
| | | 2.0 | DI water | 100.0 | | 0.75 | 37.50 |

Oil and Gas Industrial Applications

The wax deposition removal compositions and/or wax deposition removal fluids disclosed herein may be useful for or utilized in at least one oil and gas industrial application and may achieve substantially improved results with respect to the at least one oil and gas industrial application. The at to move the treatment fluid), storage tanks, pumps, mixers, instruments, transportation equipment, and the like.

In some embodiments, the cleaning of hydrocarbon wells containing wax provided by the wax deposition removal compositions and/or wax deposition removal fluids set forth in the present disclosure may achieve substantially improved performance results for a well cleaning application, such as, for example, a well cleaning application in the midstream (i.e., pipeline) market. The use of nano polysaccharides, such as nanocrystalline cellulose, makes the proposed wax deposition removal compositions and/or wax deposition removal fluids a sustainable alternative to known wax well treatment compositions. The treatment fluids and compositions described herein can also function to remove asphaltenes and scales from subterranean structures, such as wells, and from equipment as described above.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A well treatment composition comprising a polysaccharide wax removal additive dispersed in an aqueous medium for the cleaning of a well containing hydrocarbons waxes, wherein the wax removal additive is mixed with a combination of water and at least one water miscible solvent to create a nano suspension, and wherein the at least one water miscible solvent comprises aminobutyl ether.

2. The well treatment composition of claim 1, wherein the wax removal additive comprises nano polysaccharides.

3. The well treatment composition of claim 2, wherein the nano polysaccharides are present in the treatment composition at a concentration of 0.001% to 3% by weight of the treatment composition.

4. The well treatment composition of claim 2, wherein the nano polysaccharides comprise at least six carbon atoms.

5. The well treatment composition of claim 2, wherein the nano polysaccharides comprise nanocrystalline cellulose.

6. The well treatment composition of claim 2, wherein the nano polysaccharides comprise nanocrystalline cellulose with microfibers.

7. The well treatment composition of claim 2, wherein the nano polysaccharides comprise sucrose, glucose, maltose, lactose, fructose, starch, glycogen, dextrin, inulin, cyclodextrin, dextran, or a combination thereof.

8. The well treatment composition of claim 2, wherein the nano polysaccharides are modified with styrene maleic anhydride, ethylene vinyl acetate, alkyl acrylates, polyisobutylene succinic anhydride, olefin maleic anhydride, a surfactant, or a combination thereof.

9. The well treatment composition of claim 8, wherein the treatment composition comprises a surfactant that comprises alkyl sulphonic acid, alkyl phosphoric acid, alkyl amines, or a combination thereof.

10. A method, comprising using the composition of claim 1 to clean flowlines, storage tanks, and transportation lines.

11. A method, comprising preparing a well treatment composition by mixing together a polysaccharide wax removal additive and water to create a polysaccharide nano suspension, wherein the wax removal additive is mixed with a combination of water and at least one water miscible solvent to create a nano suspension, and wherein the at least one water miscible solvent comprises aminobutyl ether.

12. The method of claim 11, further comprising loading the well treatment composition into a pigging manifold connected to and in fluid communication with a pipeline.

13. The method of claim 11, further comprising cleaning a pipeline by circulating the well treatment composition disposed within the pipeline.

14. A method of cleaning a hydrocarbon well containing at least one of wax, asphaltenes, or scale, by injecting an aqueous treatment fluid comprising wax removal additives including a nano polysaccharide, wherein the wax removal additives are mixed with a combination of water and at least one water miscible solvent to create a nano suspension, and wherein the at least one water miscible solvent comprises aminobutyl ether.

15. The method of claim 14, wherein injecting the treatment fluid comprises injecting the treatment fluid into a hydrocarbon well, a flowing pipeline, a storage tank, or a transportation line.

16. The method of claim 15, comprising removing the wax from the hydrocarbon well or from the flowing pipeline or from the storage tank or from the transportation line.

17. The method of claim 14, wherein the nano polysaccharide is a fatty acid polysaccharide ester having molecular weight of about 300 to 100,000 Daltons, and the nano polysaccharide is present in the treatment fluid in a concentration of 0.1 wt % to 25 wt % based on the weight of the treatment fluid.

\* \* \* \* \*